Patented Dec. 5, 1950

2,532,523

UNITED STATES PATENT OFFICE 2,532,523

PREPARATION OF CAKES WITH LIQUID OIL

Larry G. Trempel, Decatur, Ill., and Marilyn E. Frink, Tacoma, Wash., assignors to A. E. Staley Manufacturing Co., Decatur, Ill., a corporation of Delaware No Drawing. Application April 10, 1946, Serial No. 661,058

2 Claims. (Cl. 99—92)

This invention relates to sweet goods containing sugar and shortening, such as cakes, cookies and uncooked icings for example, and to the process of making them. More specifically, it pertains to such products, and the process for making them, in which liquid shortening is used.

Substitution of a liquid shortening for the solid kind in the conventional preparation of sweet goods lowers the quality of the product to a marked degree. This is especially true of sweet baked goods containing sugar, shortening, and flour, where the use of an all-oil shortening yields a batter that does not develop properly, having a strong tendency to curdle, and a finished product that has a relatively low volume and an undesirable oily or glossy appearance. Also, uncooked icings made with an all-oil shortening ordinarily are less creamy and have less volume than the corresponding ones made with solid shortening. Efforts have long been made to prepare satisfactory sweet goods from an oil shortening agent because the edible oils are cheaper and easier to store and handle than solid fats. However, such efforts have, in effect, proven unsuccessful. It would be a distinct advantage to be able to overcome the foregoing difficulties and disadvantages and this is accomplished by means of the present invention.

Broadly, it is an object of the invention to improve the quality of sweet goods prepared with liquid shortening agents.

A more specific object of the invention is the preparation of baked sweet goods with liquid shortening agents, whereby the baked goods become light and non-glossy and possess qualities that are at least on a par with those of similar baked goods made with solid shortenings.

Another object of the invention is the preparation of uncooked icings with liquid shortenings, which icings have creamy textures and volume developments that are markedly superior to those of uncooked icings prepared with liquid shortenings by conventional procedures.

These and other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

We have discovered that the objects of this invention can be attained if, in preparing the sweet goods, a minor proportion of glycerol monostearate or glycerol distearate, or a mixture of both, is used in combination with the oil shortening in a manner that will be set forth in the following description.

In one embodiment of our invention, a small proportion of the solid glycerol stearate, preferably about 5 per cent based on the oil shortening, is mixed with an edible oil, such as refined soybean oil for example, and the mixture is warmed until the stearate dissolves in the oil. The warm solution thus prepared is stirred with the other ingredients of the sweet goods to provide a finished product, in case the sweet goods are uncooked icings, or to provide a batter which is subsequently baked, as in the case of such sweet goods as cakes, cookies, and sweet rolls.

After the solution of oil and glycerol stearate has been prepared, which usually requires heating of the mixed components to about 140° F. in the case of soybean oil and glycerol monostearate, it may be allowed to cool somewhat before it is mixed with the other ingredients of the sweet goods. Cooling, or cooling and standing of the solution, should not be allowed to proceed so far that the stearate commences to crystallize from the oil before it is mixed with the other ingredients of the sweet goods at conventional temperatures, otherwise the aforementioned beneficial effect of the added stearate will not be obtained.

It is not esesntial that the oil and stearate mixture be heated alone to dissolve the stearate, and then mixed with the oher ingredients of the sweet goods. Any procedure whereby the solution of the stearate in the oil is blended with the other ingredients is satisfactory. For example, the mixture of oil and solid stearate may first be mixed with one or more of the other ingredients of the sweet goods, preferably liquid ones, that are hot enough to bring about the required solution of stearate, and this mixture is then incorporated with the remaining ingredients; or the oil may be preheated enough to cause solution of the stearate in it when the two are mixed.

An essential feature of our process for making sweet goods with liquid shortenings is that the glycerol monostearate, or glycerol distearate, or a mixture of both, be dissolved in the liquid shortening at the time it is mixed with the remaining ingredients of the sweet goods. We have found that if the solid stearate is mixed with the oil, even as a suspension of very small crystals, and this mixture used to prepare sweet goods, the improvements in the quality of the product are only a small fraction of those provided by the process of our invention.

Since the stearates useful in our invention are solid fats melting over the range of about 125° F. to about 135° F., and are only very slightly soluble in edible oils at the temperatures at which the ingredients of sweet goods are mixed together, it is necessary to use heat to effect the desired solution of stearate in oil. The degree of heating will depend upon the kind of oil, the kind of stearate, and the ratio of the two that is used. In general, however, warming the mixture of oil and stearate to a temperature of not less than about 120° F. will be required.

Our invention contemplates the use of edible oils in general as shortening agents in the preparation of sweet goods. Examples of such oils, in addition to the refined soy bean oil previously mentioned, are the refined oils obtained from corn germs, cottonseed, peanuts, palm kernels, coconuts, and olive seeds. The terms "oil" and "liquid shortening" which are used interchangeably herein, signify a fat that is liquid at the temperatures at which the complete mixture of the ingredients of the sweet goods is prepared. These temperatures generally lie within the range of about 60° F. to about 80° F.

Our invention is applicable to the preparation of sweet goods in general containing sugar and shortening. The sweet goods may be either baked or unbaked, i. e., uncooked. Baked sweet goods contain flour in addition to the ingredients mentioned above. As examples of baked sweet goods made with liquid shortenings whose qualities are improved by application of our invention to their preparation, there may be cited cakes, cookies, and sweet rolls. Uncooked icings for cakes, cookies, and sweet rolls comprise the principal class of uncooked sweet goods embraced by our invention.

Our invention is applicable to the preparation of baked sweet goods containing widely varying weight ratios of sugar to flour. More specifically, the scope of the application of our invention to sweet baked goods is not limited to those containing more sugar than flour by weight.

In the practice of our invention in its preferred form, glycerol monostearate is used, and its optimum proportion, based on the weight of oil, lies within the range of about 4 per cent to about 6 per cent. However, distinctly beneficial results are obtained throughout the range of about 2 per cent to about 10 per cent. The improvement in quality of the sweet goods is somewhat less as the proportion of monostearate falls below 2 per cent or exceeds 10 per cent of the oil.

We have found that more glycerol distearate than monostearate, based on the oil, is required to effect a given improvement in sweet goods, especially baked sweet goods. In general, about two parts of distearate are required to produce the effect of one part of monostearate. The optimum proportion of glycerol distearate, based on the weight of oil, is in the vicinity of 10 per cent, although distinctly beneficial results are obtained throughout the range of about 3 per cent to about 20 per cent.

Although our invention has maximum utility in the preparation of sweet goods, and especially baked sweet goods made with all-liquid shortening, since maximum savings are obtained by substituting an all-liquid shortening for an all-solid one, it is also useful in the preparation of sweet goods any part of whose shortening content is liquid. The improvement in the product provided by the process of our invention is in proportion to the ratio of liquid to solid shortening present.

The term "glycerol monostearate" as used herein includes all the isomeric forms of this substance and mixtures thereof. Similar meaning is to be attached to the term "glycerol distearate" as used herein. Highly purified stearates are not required in the practice of this invention. Commercial edible grades are satisfactory.

Our invention is more fully illustrated by the following examples, in which all parts are by weight unless otherwise specified.

*Example No. 1.—Chocolate icing*

| | Parts |
|---|---|
| Sugar | 1280 |
| Non-fat milk solids | 50 |
| Natural cocoa | 120 |
| Salt | 2.4 |
| Water | 260 |
| [1] "Sweetose" (43° Bé.) | 120 |
| Refined soybean oil | 190 |
| Glycerol monostearate | 10 |
| Chocolate liquor | 140 |
| Vanilla | 7.5 |

[1] "Sweetose" is a corn sirup prepared according to directions given in United States Patent No. 2,201,609.

The sugar, milk solids, cocoa, and salt are mixed together by sifting and then placed in the bowl of a mixing machine, e. g. a Hobart mixer. The water and "Sweetose" are mixed together and heated to boiling. The hot solution is then added to the ingredients in the mixing bowl and all are stirred to a creamy consistency. The oil and glycerol monostearate are mixed together and heated to about 140° F. to provide a solution of the stearate in the oil. This solution is then stirred into the creamed ingredients in the mixing bowl. Next the melted chocolate liquor is added to the bowl and mixed in thoroughly with the other ingredients. Lastly, the vanilla is added and stirred in well.

Icing made with this formula, less the glycerol monostearate, or with it but without using it as a solution in the oil, has a coarser texture and less volume than the product of this example.

*Example No. 2.—Yellow cake*

| | Parts |
|---|---|
| Water | 204 |
| Cake flour | 200 |
| Sugar | 260 |
| Salt | 6.25 |
| Baking powder | 13.75 |
| Full fat soy flour | 25 |
| Refined soybean oil | 85.5 |
| Glycerol monostearate | 4.5 |
| Whole eggs | 100 |

All but 80 parts of the water is placed in the bowl of a mixing machine. The sugar, salt, baking powder, soy flour, and the cake flour are mixed together by sifting and then added to the water in the bowl. The glycerol monostearate is dissolved in the oil by mixing the two and warming the mixture to about 140° F. The solution is immediately added to the other ingredients in the mixer bowl, and the mixture is stirred until it is smooth. Stirring is then continued for 5 minutes at medium speed. The eggs and reserved portions of water (80 parts) are mixed together and added at low stirring speed to the mixture in the bowl in two or three equal portions, mixing smooth after each addition. After the last portion is added, the batter is stirred for an additional five minutes at low speed.

Cake made by baking this batter has excellent volume and a pleasing non-glossy appearance. If the glycerol monostearate is added in the solid state to the batter, even though suspended as small crystals in the oil, the cake will have low volume and an objectionable oily or glossy appearance.

Example No. 3.—Sweet rolls

| | Parts |
|---|---|
| Whole eggs | 160 |
| Flavor blend | 5 |
| Salt | 20 |
| Sugar | 220 |
| Refined soybean oil | 200 |
| Glycerol monostearate | 10 |
| Water | 570 |
| Yeast | 88 |
| Full fat soy flour | 120 |
| Bread flour | 1000 |

The eggs, flavor blend, salt, and sugar are placed in the bowl of a mixing machine. The glycerol monostearate and soybean oil are heated together to about 140° F. The solution thus obtained is immediately stirred with the ingredients in the bowl until a light and creamy mixture is obtained. The yeast is slurried with about an equal weight of water, and the soy flour is mixed to a smooth paste with the remaining water. The water slurries of yeast and soy flour are then stirred in with the ingredients already in the mixing bowl. The bread flour is then stirred in gradually and mixing is continued to form a medium soft dough, or until the dough leaves the sides of the mixing bowl.

Rolls baked from this dough are light and non-glossy. If, in this example, the glycerol monostearate in the solid state were mixed in with the other dough ingredients, the rolls would be dense and glossy.

Example No. 4.—Sugar cookies

| | Parts |
|---|---|
| Sugar | 530 |
| Salt | 12.5 |
| Non-fat milk solids | 20 |
| Refined soybean oil | 215 |
| Glycerol monostearate | 11 |
| Water | 230 |
| Vanilla | 2.5 |
| Ammonium bicarbonate | 5 |
| Soft flour | 1000 |
| Sodium bicarbonate | 10 |
| Monocalcium acid phosphate | 5 |

The salt, milk solids, and 340 parts of the sugar are placed in the bowl of a mixing machine. The soybean oil and glycerol monostearate are heated together to about 140° F., and the solution thus obtained is immediately stirred with the ingredients in the bowl until a creamy mixture is secured. The remaining 190 parts of sugar are dissolved in 150 parts of the water at the lowest possible temperature, and this solution is then added with stirring to the mixture in the bowl. The ammonia and vanilla, mixed with the remaining 40 parts of water, are stirred in next. The flour, soda, and phosphate are blended together by sifting and then stirred in with the other ingredients in the bowl to form a medium soft dough.

Cookies baked from this dough are relatively light and non-glossy, as compared to the heavy and glossy ones that would be obtained from this formula if the glycerol monostearate were mixed in the solid state with the other dough ingredients.

Example No. 5.—Yellow cake

This example is a duplicate of Example No. 2 except for substitution of 10 parts of glycerol distearate for the 4.5 parts of glycerol monostearate. Cake baked from the batter thus produced compared favorably with cake baked from batter prepared according to Example No. 2.

Icings and baked sweet goods were prepared according to our invention with other edible oils as shortening agents, including refined corn oil, refined cottonseed oil, refined peanut oil, and refined olive oil. In all cases incorporation of the glycerol monostearate or distearate as a solution in the oil gave the expected improvement in quality of the sweet goods over that of the same goods obtained when a suspension of solid stearate in the oil was used.

It is to be understood that the foregoing examples are only illustrative embodiments of our invention, and that our invention is not limited to the exact details set forth in the examples.

It is also to be understood that the following claims are intended to cover all of the generic and specific features of the invention herein described, and all statements of the scope of the invention which, as a matter of language, might be said to fall therebetween.

Having thus described our invention, what we claim as new and desire to secure by Letters Patent are:

1. In the preparation of cakes wherein the batter ingredients include liquid triglyceride oil as the shortening agent and glycerol monostearate as an emulsifying agent, the improvement comprising: mixing together and heating said oil and monostearate to form a solution and mixing said solution, at a temperature of at least about 120° F., with the other batter ingredients; said monostearate being present at a concentration of 4 to 6% based on the weight of the oil.

2. In the preparation of cakes wherein the batter ingredients include liquid triglyceride oil as the shortening agent and glycerol distearate as an emulsifying agent, the improvement comprising: mixing together and heating said oil and distearate to form a solution and mixing said solution, at a temperature of at least about 120° F. with the other batter ingredients; said distearate being present at a concentration of 8 to 12% based on the weight of the oil.

LARRY G. TREMPEL.
MARILYN E. FRINK.

REFERENCES CITED

The following references are of record in the file of this patent:

UNITED STATES PATENTS

| Number | Name | Date |
|---|---|---|
| 2,132,395 | Coith et al. | Oct. 11, 1938 |
| 2,132,416 | Harris | Oct. 11, 1938 |
| 2,132,701 | Richardson et al. | Oct. 11, 1938 |